(12) United States Patent
Tseng et al.

(10) Patent No.: US 11,036,094 B2
(45) Date of Patent: Jun. 15, 2021

(54) LIQUID CRYSTAL DISPLAY DEVICE

(71) Applicant: InnoLux Corporation, Miao-Li County (TW)

(72) Inventors: Yu-Chih Tseng, Miao-Li County (TW); Chu-Hong Lai, Miao-Li County (TW); Kuo-Shun Tsai, Miao-Li County (TW); Chen-Shuo Hsieh, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/731,092

(22) Filed: Dec. 31, 2019

(65) Prior Publication Data

US 2020/0249514 A1 Aug. 6, 2020

(30) Foreign Application Priority Data

Feb. 1, 2019 (CN) .......................... 201910105114.5

(51) Int. Cl.
*G02F 1/1339* (2006.01)
*G02F 1/1333* (2006.01)

(52) U.S. Cl.
CPC .... *G02F 1/13394* (2013.01); *G02F 1/133305* (2013.01)

(58) Field of Classification Search
CPC .................................................. G02F 1/13394
See application file for complete search history.

(56) References Cited

U.S. PATENT DOCUMENTS

| 2015/0116621 | A1 | 4/2015 | Park |
| 2015/0261029 | A1* | 9/2015 | Park .................... G02F 1/13394 349/106 |
| 2016/0170251 | A1 | 6/2016 | Xiong |
| 2016/0282654 | A1* | 9/2016 | Fu ........................ G02F 1/13394 |
| 2018/0284523 | A1* | 10/2018 | Higano ............... H01L 27/1248 |
| 2018/0348555 | A1* | 12/2018 | Okita .................... G02F 1/1343 |
| 2018/0348556 | A1* | 12/2018 | Jin .................... G02F 1/133305 |

* cited by examiner

*Primary Examiner* — Alexander P Gross
(74) *Attorney, Agent, or Firm* — Winston Hsu

(57) ABSTRACT

A liquid crystal display device including a first flexible substrate, a plurality of first spacers, a second flexible substrate, a plurality of second spacers, and a liquid crystal layer is provided. The first spacers are disposed on the first flexible substrate, the second flexible substrate is disposed opposite to the first flexible substrate, the second spacers are disposed on the second flexible substrate, and the liquid crystal layer is disposed between the first flexible substrate and the second flexible substrate.

11 Claims, 7 Drawing Sheets

LIQUID CRYSTAL DISPLAY DEVICE

CROSS REFERENCE TO RELATED APPLICATION

This application claims the benefit of Chinese Patent Application Serial No. 201910105114.5, filed Feb. 1, 2019, the entire content of which is incorporated herein by reference.

BACKGROUND OF THE DISCLOSURE

1. Field of the Disclosure

The present disclosure relates to a liquid crystal display device, and more particularly to a liquid crystal display device with a flexible substrate.

2. Description of the Prior Art

With the progress of technology, display devices are gradually developed towards the trend of lightness and thinness. In liquid crystal display devices, glass substrate can be replaced by flexible substrate formed of plastic material so as to reduce whole weight and whole thickness, which may be called plastic liquid crystal display (PLCD). However, the PLCD still has several disadvantages needed to be improved. For example, since the flexible substrate is bendable, after the polarizer is attached to the flexible substrate, stress generated from the polarizer to the flexible substrate will bend the flexible substrate, resulting in dislocation between color filter substrate and thin-film transistor substrate of the liquid crystal display device, which is relative positions between pixel electrodes of the thin-film transistor substrate and corresponding color filters are shifted, or causing distortion of the pixel electrode or the color filter. Thus, abnormal light-mixing effect is generated in the liquid crystal display device. In a design of the color filter integrated into the thin-film transistor substrate (i.e. color filter on array, COA), although the color filter is directly manufactured on the thin-film transistor substrate such that no dislocation is generated between the color filter and the pixel electrode, openings of black matrix still will be dislocated with corresponding pixel electrode or color filter, resulting in large loss of aperture ratio.

SUMMARY OF THE DISCLOSURE

An embodiment of the present disclosure provides a liquid crystal display device including a first flexible substrate, a plurality of first spacers, a second flexible substrate, a plurality of second spacers, and a liquid crystal layer. The first spacers are disposed on the first flexible substrate, the second flexible substrate is disposed opposite to the first flexible substrate, the second spacers are disposed on the second flexible substrate, and the liquid crystal layer is disposed between the first flexible substrate and the second flexible substrate.

These and other objectives of the present disclosure will no doubt become obvious to those of ordinary skill in the art after reading the following detailed description of the embodiment that is illustrated in the various figures and drawings.

DETAILED DESCRIPTION

Figure 1:
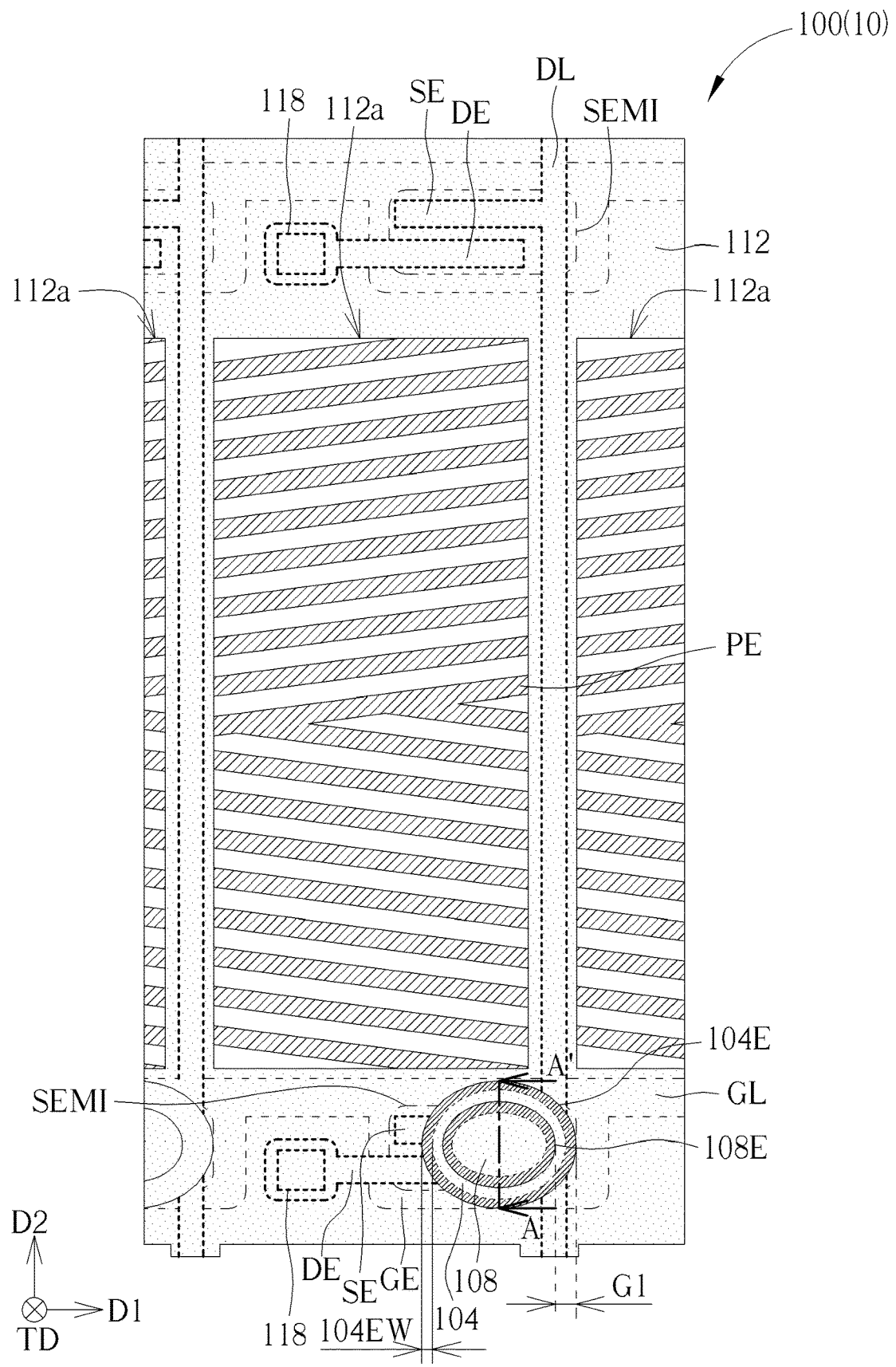
FIG. 1 is a schematic diagram illustrating a top view of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". It will be understood that when a component is referred to as being "connected to" another component (or its variant), it can be directly connected to the another component, or connected to the another component through one or more intervening components.

Although the terms such as first, second, etc. may be used in the description and following claims to describe various components in claims, these terms doesn't mean or represent the claimed components have order and doesn't represent the order of one claimed component and another one claimed component, or the sequence in manufacturing method. These terms are used to discriminate a claimed component with a denomination from another one claimed component with the same denomination.

It should be noted that the technical features in different embodiments described in the following description can be replaced, recombined, or mixed with one another to constitute another embodiment without departing from the spirit of the present disclosure.

An electronic device 10 includes a first flexible substrate 102, a plurality of first spacers 104, a second flexible substrate 106, and a plurality of second spacers 108. The first flexible substrate 102 and the second flexible substrate 106 are disposed opposite to each other and used for supporting driving components, array components or other required film layers in the electronic device, and the first flexible substrate 102 and the second flexible substrate 106 have a bendable property, for example may include a glass substrate, a polymer substrate or other suitable substrate. For example, a material of the first flexible substrate 102 and a material of the second flexible substrate 106 may include polyimide (PI), polyethylene terephthalate (PET), polycarbonate (PC), polyethersulfone (PES), polybutylene terephthalate (PBT), polyethylene naphthalate (PEN), polyarylate (PAR), other suitable materials or any combination thereof, but not limited thereto. The first spacers 104 may be disposed on the first flexible substrate 102, and the second spacers 108 may be disposed on the second flexible substrate 106.

Figure 2:
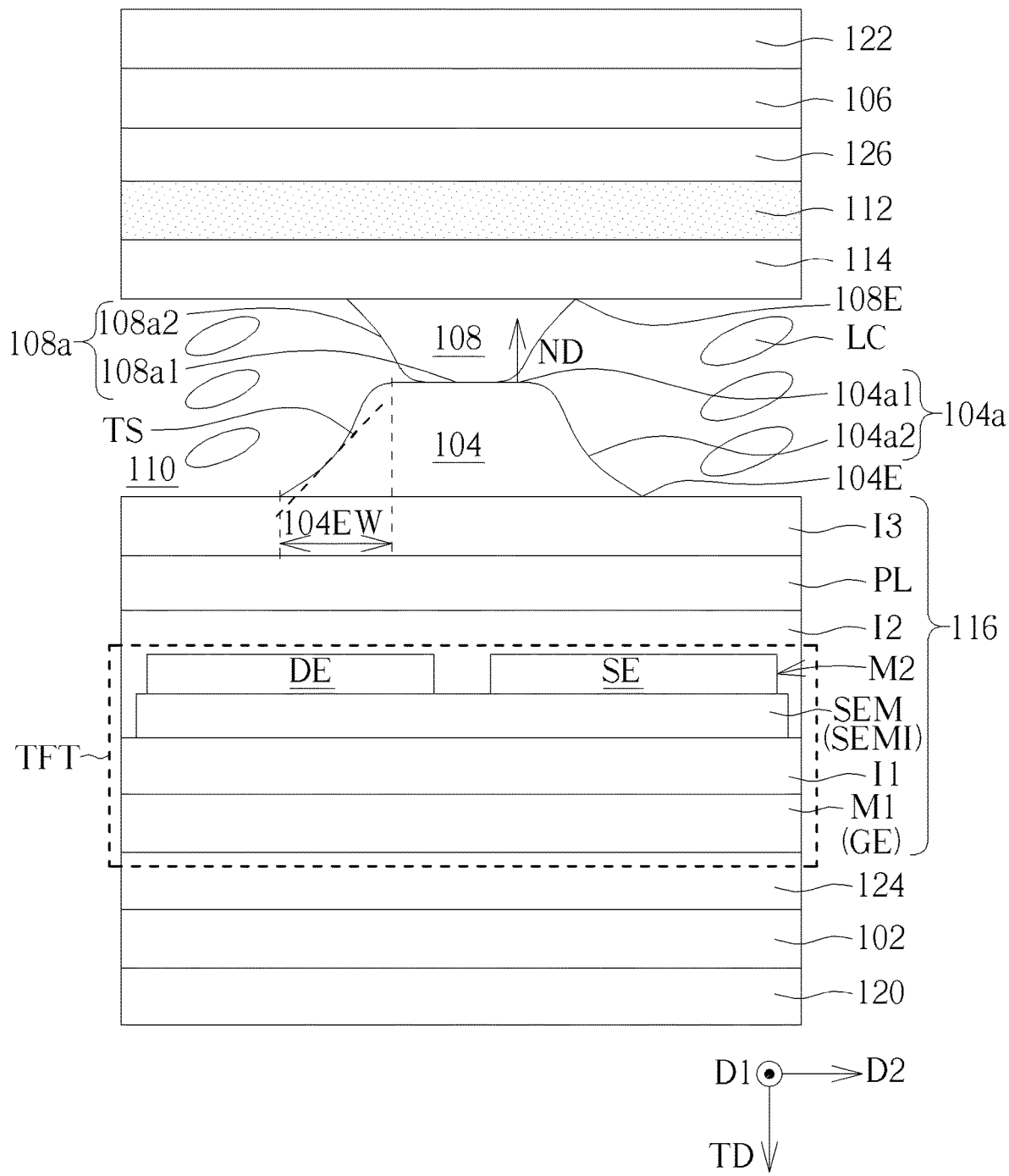
FIG. 2 is a schematic diagram illustrating a cross-sectional view of FIG. 1 taken along a cross-sectional line A-A'.

FIG. 1 is a schematic diagram illustrating a top view of an electronic device according to a first embodiment of the present disclosure, and FIG. 2 is a schematic diagram illustrating a cross-sectional view of FIG. 1 taken along a cross-sectional line A-A'. For clearly illustrating the electronic device of the present disclosure, FIG. 1 illustrates a single sub-pixel of the electronic device 10 and ignores second flexible substrate, color filter layer, liquid crystal layer and insulation layer, but is not limited thereto. Specifically, as shown in FIG. 2, the first spacers 104 are disposed on the first flexible substrate 102 and close to the second flexible substrate 106, the second spacers 108 are disposed on the second flexible substrate 106 and close to the first flexible substrate 102, and then, the first flexible substrate 102 and the second flexible substrate 106 are attached to each other, such that the first spacers 104 and the second spacers 108 are disposed correspondingly, and one of the first spacers 104 and the corresponding second spacer 108 may overlap or not overlap. As shown in FIG. 1, in a top view direction TD, one of the first spacers 104 may overlap one of the second spacers 108 in this embodiment. Also, a whole of a projection area of the second spacers 108 may overlap a projection area of the first spacers 104, but the projection area of the first spacers 104 may not fully overlap the projection area of the second spacers 108, and the present disclosure is not limited thereto. The term "top view direction TD" may refer to a direction perpendicular to the electronic device 10. It is noted that a surface 104a of one of the first spacers 104 may contact a surface 108a of the corresponding second spacer 108 or indirectly contact the corresponding second spacer 108 through other film layer (s), such that friction force between the first spacers 104 and the second spacers 108 may be increased, thereby reducing relative movement of the first flexible substrate 102 and the second flexible substrate 106 in a horizontal direction. The term "horizontal direction" may refer to a direction parallel to the electronic device 10, such as a first direction D1 or a second direction D2, but not limited thereto. A material of the first spacers 104 and a material of the second spacers 108 may for example respectively include a photoresist material, a color filter material or other suitable insulation material. As an example, the first spacers 104 may be formed on the first flexible substrate 102 by a photolithographic process or further in combination with an etching process, and the second spacers 108 may be formed on the second flexible substrate 106 by a photolithographic process or further in combination with an etching process. In some embodiments, the first spacers 104 and the second spacers 108 may respectively be a single-layer or multilayer structure.

Furthermore, in the top view direction TD, one of the first spacers 104 may covers the corresponding second spacer 108 in this embodiment. In other words, the projection area of the first spacer 104 may be greater than the projection area of the corresponding second spacer 108, so as to facilitate aligning the first spacer 104 with the corresponding second spacer 108 when the first flexible substrate 102 is attached to the second flexible substrate 106. Alternatively, one of the first spacers 104 and the corresponding second spacer 108 may be fully overlap the other one of the first spacer 104 and the corresponding second spacer 108, so as to reduce uneven stresses on the surfaces of the first spacer 104 and the corresponding second spacer 108 caused by partial overlap between the first spacer 104 and the corresponding second spacer 108. For example, the area of the corresponding second spacer 108 may be greater than or less than the area of the first spacer 104. Viewed from the top view direction TD, a distance G1 between an outer edge 108E of the second spacer 108 and an outer edge 104E of the corresponding first spacer 104 may be less than 5 microns (μm), for example in a range from 2 μm to 3 μm. In some embodiments, the first spacer 104 and the corresponding second spacer 108 may be replaced with each other. In this disclosure, the outer edge 104E or 108E of a spacer viewed from the top view direction TD is an outmost edge of the surface 104a or 108a.

In this embodiment, as shown in the cross-sectional view of FIG. 2, the surface 104a of the first spacer 104 and the surface 108a of the second spacer 108 corresponding to each other may be curved. Taking the surface 104a of the first spacer 104 as an example, the surface 104a of the first spacer 104 may optionally have a planar portion 104a1 and a curved portion 104a2, and the curved portion 104a2 may have a width 104EW in the top view direction TD of FIG. 1 (e.g., from the outer edge 104E of the outermost border of the curved portion 104a2 to the highest point of the curved portion 104a2 in the top view direction TD). In this case, if the distance G1 needs to be measured, the outer edge 104E of the outermost border serves as a calculation point. In addition, the surface of one of lower layers disposed under the first spacer 104 may be found and serve as a horizontal plane (e.g., the insulation layer 13 in FIG. 2) in the cross-sectional view. The starting point where the surface 104a of the first spacer 104 contacts the horizontal plane is the outermost border, i.e., the outer edge 104E. Furthermore, the distance between the outer edges 104E on two sides of the first spacer 104 in the cross-sectional view is the maximum width of the first spacer 104 in the cross-sectional view. The same method may be used to find the outer edges 108E of the second spacer 108 and obtain the maximum width of the second spacer 108 in a cross-sectional view, and the difference between the maximum width of the first spacer 104 and the maximum width of the second spacer 108 may be less than 10 μm, for example, in a range from 4 μm to 6 μm. It is noted that the above two maximum widths may be calculated from the same cross-sectional view, or may be obtained separately from different cross-sectional views.

In this embodiment, the surface 108a of the second spacer 108 facing the first flexible substrate 102 may also have a planar portion 108a1 and a curved portion 108a2, but is not limited thereto. The normal direction ND of the surface of the planar portion 104a1 is parallel to the normal direction of the first flexible substrate 102 (e.g., the top view direction TD), that is, the planar portion 104a1 may be substantially parallel to the first flexible substrate 102. The surface 104a other than the plane portion 104a1 is the curved portion 104a2, and an acute angle between the tangent direction TS of the curved portion 104a2 and the normal direction of the first flexible substrate 102 is greater than 0 degrees and less than 90 degrees, and the acute angle may change continuously. In some embodiments, the surface 104a of the first spacer 104 and/or the surface 108a of the second spacer 108 may not have a planar portion, that is, the entire surface 104a of the first spacer 104 and/or the entire surface 108a of the second spacer 108 may be curved. In some embodiments, the surface 104a of the first spacer 104 and/or the surface 108a of the second spacer 108 may have a sidewall portion perpendicular to the first flexible substrate 102 in addition to the planar portion and the curved portion (such as the spacer shown in FIG. 6, the tangent direction TS of the sidewall portion of the spacer is substantially parallel to the normal direction of the first flexible substrate 102). In some embodiments, the surface 104a of the first spacer 104 and/or the surface 108a of the second spacer 108 may have the curved portion and the sidewall portion, but do not have the planar portion. In addition, the curved portions of different spacers may be different, for example, the curved slope or the curved radian may be different, so the widths of the curved portions may be different and may be changed according to design.

In this embodiment, the electronic device 10 may for example be a liquid crystal display device 100 and include a liquid crystal layer 110 disposed between the first flexible substrate 102 and the second flexible substrate 106, but the present disclosure is not limited thereto. In other embodiments, the electronic device 10 may also be a liquid crystal lens, a sensing device or an antenna, but the present disclosure is not limited thereto. In this embodiment, the liquid crystal layer 110 may include a plurality of liquid crystal molecules LC for adjusting display gray scales of the liquid crystal display device 100. In addition, the liquid crystal display device 100 may further include a shielding pattern 112 having a plurality of openings 112a for defining a size of each sub-pixel of the liquid crystal display device 100. As shown in FIG. 1, the openings 112a may be arranged in an array formation as an example, but not limited thereto. A row direction and a column direction of the openings 112a may for example be the first direction D1 and the second direction D2 respectively, but not limited thereto. For avoiding the first spacers 104 and the second spacers 108 affecting the aperture ratio of the sub-pixel, the shielding pattern 112 may cover the first spacers 104 and the second spacers 108 in the top view direction TD, so as to shield the first spacers 104 and the second spacers 108. In this embodiment, the shielding pattern 112 may be disposed between the second flexible substrate 106 and the liquid crystal layer 110. In other embodiments, the shielding pattern 112 may be disposed between the first flexible substrate 102 and the liquid crystal layer 110. In some embodiments, the first direction D1 may be for example perpendicular to the second direction D2.

The liquid crystal display device 100 may further include a color filter layer 114 covering the openings 112a of the shielding pattern 112. In this embodiment, a portion of the color filter layer 114 may be disposed between the shielding pattern 112 and the liquid crystal layer 110. In some embodiments, the color filter layer 114 may be disposed between the shielding pattern 112 and the second flexible substrate 106. In some embodiments, the color filter layer 114 may also be disposed between the first flexible substrate 102 and the liquid crystal layer 110. Specifically, the color filter layer 114 may include a plurality of first color filter blocks (not shown), a plurality of second color filter blocks (not shown), and a plurality of third color filter blocks (not shown), respectively covering the corresponding openings 112a and respectively having a first color, a second color, and a third color, in which the first color, the second color, and the third color may be mixed into white. For example, each first color filter block, each second color filter block and each third color filter block corresponding to the same row of openings 112a may be alternately arranged along the row direction of the openings 112a.

In some embodiments, the liquid crystal display device 100 may optionally include an alignment layer (not shown) disposed between the color filter layer 114 and the liquid crystal layer 110 according to its type. In some embodiments, one of the second spacers 108 may be directly disposed on the alignment layer, but is not limited thereto. In some embodiments, the second spacer 108 may be a portion of the color filter layer 114. In some embodiments, the second spacer 108 may be directly disposed on the color filter layer, and the alignment layer is disposed on the second spacer 108. In such situation, a portion of the alignment layer may be located between one of the second spacers 108 and the corresponding first spacer 104, but is not limited thereto.

In this embodiment, the liquid crystal display device 100 may further include a thin-film transistor layer 116 disposed between the liquid crystal layer 110 and the first flexible substrate 102. For example, as depicted in FIG. 2, the thin-film transistor layer 116 may include a first metal pattern layer M1, an insulation layer I1, a semiconductor layer SEM, a second metal pattern layer M2, an insulation layer I2, a planar layer PL, a first transparent electrode (not shown), an insulation layer I3, and a second transparent electrode (not shown) sequentially stacked on the first flexible substrate 102. The lamination structure of the above-mentioned thin-film transistor layer 116 is only an example, and the lamination relationship may also be adjusted according to design requirements. As shown in FIG. 1, the first metal pattern layer M1 may include, for example, a plurality of gate electrodes GE and a plurality of gate lines GL. The insulation layer I1 may serve as a gate insulation layer. The semiconductor layer SEM may include a plurality of semiconductor islands SEMI. The second metal pattern layer M2 may include a plurality of source electrodes SE, a plurality of drain electrodes DE, and a plurality of data lines DL. One of the first transparent electrode and the second transparent electrode may serve as a pixel electrode PE, the other one of the first transparent electrode and the second transparent electrode may serve as a common electrode (not shown), and the first transparent electrode and the second transparent electrode are electrically insulated from each other by the insulation layer I3. A material of the first transparent electrode and a material of the second transparent electrode may respectively include, for example, a transparent conducting oxide (TCO), such as an ITO, IZO or other suitable materials. The gate lines GL extend in the first direction DL, and the data lines DL extend in the second direction D2. The gate electrode GE, the gate insulation layer, the semiconductor island SEMI, the source electrode SE and the drain electrode DE may form a thin-film transistor TFT, and the thin-film transistor TFT of this embodiment may be a bottom gate type. In some embodiments, the thin-film transistor TFT may be of a top gate type, a dual gate type, or other types, but is not limited thereto. The liquid crystal display device 100 of this embodiment may be, for example, of an in-plane switch (IPS) type. In some embodiments, the thin-film transistor layer 116 may have different designs according to the type of the liquid crystal display device 100, for example, the liquid crystal display device 100 may be of a vertical alignment type, but is not limited thereto.

In some embodiments, the liquid crystal display device 100 may optionally include another alignment layer (not shown) disposed between the insulation layer I3 and the liquid crystal layer 110 according to its type. In some embodiments, one of the first spacers 104 may be directly disposed on the another alignment layer, but is not limited thereto. In some embodiments, the first spacer 104 may be a portion of the insulation layer I3. In some embodiments, the first spacer 104 may be directly disposed on the insulation layer I3, and the alignment layer is disposed on the first spacer 104. In this case, a portion of the alignment layer may be located between one of the first spacers 104 and the corresponding second spacer 108, but is not limited thereto.

As shown in FIG. 1, each opening 112*a* of the shielding pattern 112 corresponds to a pixel electrode PE, so that each pixel electrode PE can control the rotation state of the liquid crystal molecules LC of the liquid crystal layer 110 corresponding to one of the openings 112*a*, thereby controlling the gray scale value of the corresponding sub-pixel. It should be noted that although FIG. 1 does not show a portion of the pixel electrode PE overlapping the shielding pattern 112 in the top view direction TD, the pixel electrode PE may have at least a portion extending to overlap the drain electrode DE to be electrically connected to the corresponding drain electrode DE through a corresponding contact hole 118. For example, the pixel electrode PE may be located between the planar layer PL and the insulation layer 13 shown in FIG. 2, and the contact hole 118 may be located in the planar layer PL and the insulation layer 12, but is not limited thereto. In other embodiments, the pixel electrode PE may be located between the insulation layer 13 and the liquid crystal layer 110 shown in FIG. 2, and the contact hole 118 may be located in the planar layer PL, the insulation layer 12, and the insulation layer 13. It should be noted that due to the disposition of the contact holes 118, the upper surface of the insulation layer 13 corresponding to the contact holes 118 may not be flat, so the positions of the first spacers 104 in the top view direction TD may be separated from the positions of the contact holes 118 as much as possible. As shown in FIG. 1, one of the first spacers 104 of this embodiment may be for example disposed directly above the corresponding thin-film transistor TFT, but is not limited thereto.

In this embodiment, as shown in FIG. 2, the liquid crystal display device 100 may further include a first polarizer 120 and a second polarizer 122. The first polarizer 120 is attached to a side of the first flexible substrate 102 away from the first spacers 104, and the second polarizer 122 is attached to a side of the second flexible substrate 104 away from the second spacers 108. In some embodiments, the liquid crystal display device 100 may further optionally include a first buffer layer 124 and a second buffer layer, in which the first buffer layer 124 is disposed between the thin-film transistor layer 116 and the first flexible substrate 102, and the second buffer layer 126 is disposed between the shielding pattern 112 and the second flexible substrate 106. Since the first buffer layer 124 and the first polarizer 120 are respectively disposed on two opposite sides of the first flexible substrate 102, the first buffer layer 124 can be used to balance the outward bending stress generated by the first polarizer 120 on the first flexible substrate 102, so as to reduce the bending of the first flexible substrate 102 caused by the stress of the first polarizer 120. Similarly, the second buffer layer 126 disposed on one side of the second flexible substrate 106 opposite to the second polarizer 122 can be used to balance the outward bending stress generated by the second polarizer 122 on the second flexible substrate 106, so as to reduce the bending of the second flexible substrate 106 caused by the stress of the second polarizer 122. A material of the first buffer layer 124 and a material of the second buffer layer 126 may include, for example, silicon oxide, silicon nitride, or other suitable materials, respectively.

It is noted that in the conventional liquid crystal display device, when a polarizer is attached to a flexible substrate, the flexible substrate will be stressed by the polarizer, such that the relative positions between the pixel electrode PE of the thin-film transistor substrate and the corresponding color filter block are shifted, causing abnormal light-mixing phenomenon in the liquid crystal display device. In this embodiment, since the surface 104*a* of one of the first spacers 104 and the surface 108*a* of the corresponding second spacer 108 that overlap each other can contact each other, or contact each other through other film layers, the friction force between the first spacer 104 and the corresponding second spacer 108 is increased, and the relative movement of the first spacer 104 and the corresponding second spacer 108 in the horizontal direction is reduced, so as to reduce the relative movement between the first flexible substrate 102 and the second flexible substrate 106 in the horizontal direction, and further reduce the offset of the pixel electrode PE and the corresponding color filter block or the corresponding opening 112*a* in the top view direction TD. Thus, the display quality of the liquid crystal display device 100 can be improved.

The electronic device of the present disclosure is not limited to the above-mentioned embodiment and may have different variant embodiments or other embodiments. To simplify the description, same components in other embodiments would be labeled with the same symbols in the first embodiment. To compare the dissimilarities among the first embodiment and other embodiments conveniently, the following description will detail the dissimilarities among the first embodiment and other embodiments and the identical features will not be redundantly described.

Figure 3:
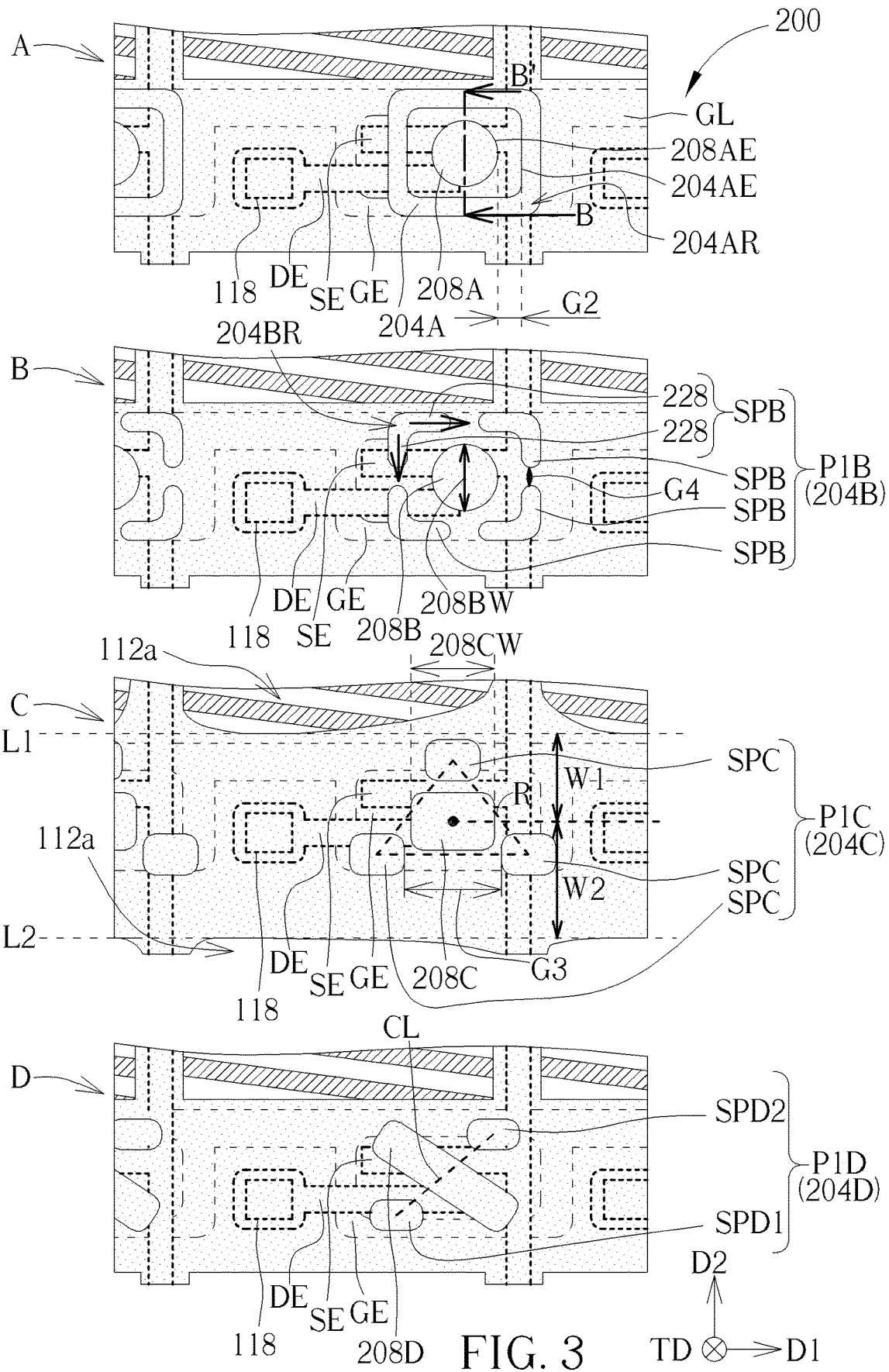
FIG. 3 is a schematic diagram illustrating a top view of different parts of the electronic device according to a second embodiment of the present disclosure.
Figure 4:
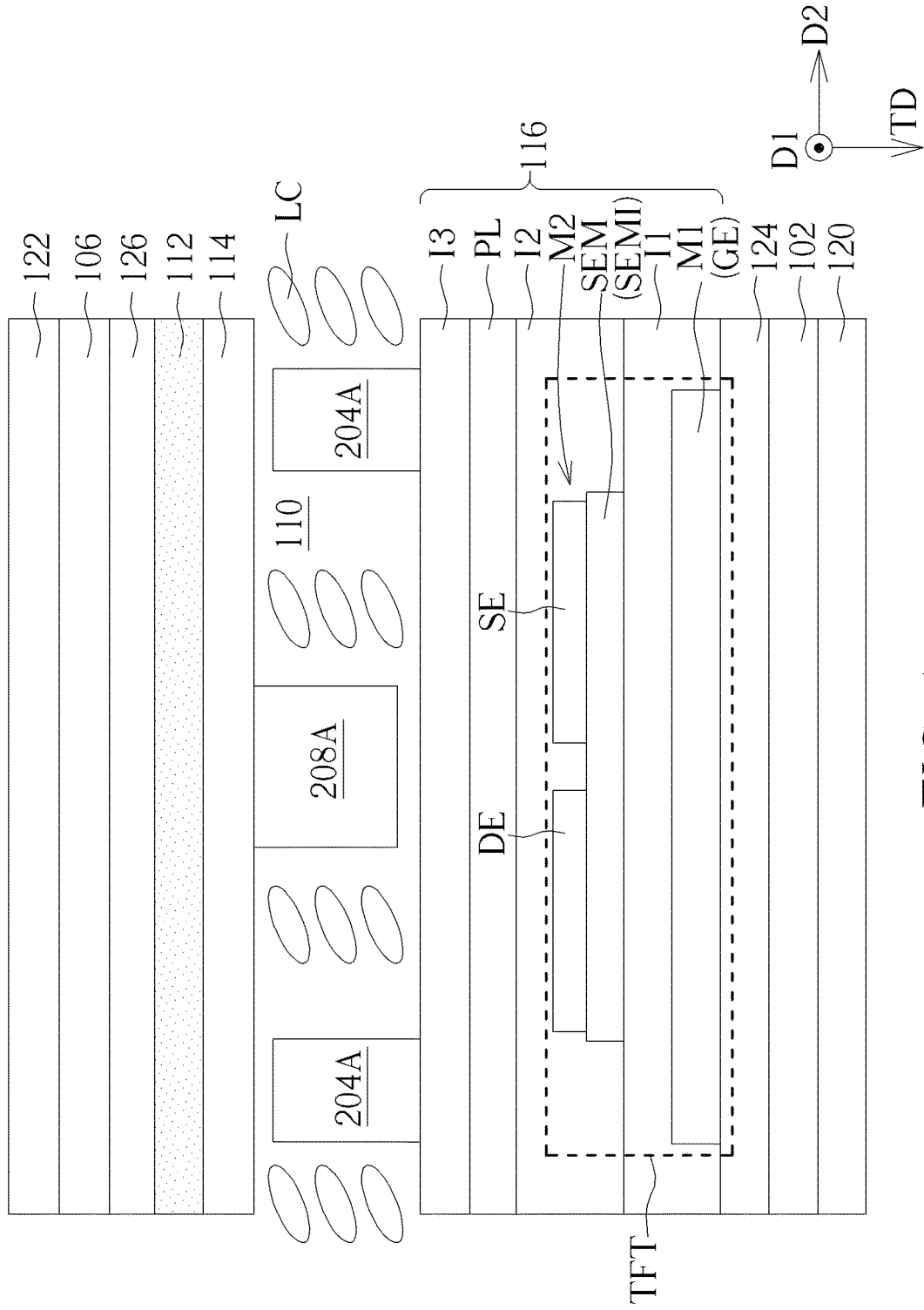
FIG. 4 is a schematic diagram illustrating a cross-sectional view of FIG. 3 taken along a cross-sectional line B-B'.

FIG. 3 is a schematic diagram illustrating a top view of different parts of the electronic device according to a second embodiment of the present disclosure, and FIG. 4 is a schematic diagram illustrating a cross-sectional view of FIG. 3 taken along a cross-sectional line B-B'. The electronic device of this embodiment takes the liquid crystal display device 200 as an example, but is not limited thereto. For clarity, the liquid crystal display device 200 shown in FIG. 3 omits the second flexible substrate, the color filter layer, the liquid crystal layer and the insulation layer, but is not limited thereto. FIG. 3 shows the shape of the outer edge of the bottom of the spacer. It should be noted that one of the first spacers 204A may be disposed adjacent to one of the second spacers 208A. In order to achieve the function of limiting the local relative position, as shown in FIG. 4, the first spacer 204A and the corresponding second spacer 208A may partially overlap in the horizontal direction (e.g., the second direction D2), and the first spacer 204A does not overlap the second spacer 208A in the top view direction TD. In other words, the first spacer 204A and the second spacer 208A may for example serve as mortise and tenon, so as to reduce the relative movement between the first flexible substrate 102 and the second flexible substrate 106 in the horizontal direction. With this design, the relative movement between the first flexible substrate 102 and the second flexible substrate 106 in the horizontal direction can be reduced, thereby mitigating the offset of the relative position between the pixel electrode and the corresponding color filter block or the corresponding opening 112*a* in the top view direction TD. The display quality of the liquid crystal display device 200 may also be improved.

As shown in part A of FIG. 3, one of the first spacers 204A of the liquid crystal display device 200 provided in this embodiment may surround one of the second spacers 208A. For example, the top-view shape of the first spacer 204A may be a closed ring shape, and by means of the first spacer 204A surrounding the second spacer 208A, the position of the second spacer 208A is limited within the ring shape of the first spacer 204A, thereby achieving the function of limiting the local relative position. In this embodiment, the ring shape is substantially rectangular, and the curved design at the corner of the spacer can reduce the process difficulty, but the present disclosure is not limited thereto. In other embodiments, the ring shape may be circular. Seen from the top view direction TD, the outer edge 208AE of the bottom of the second spacer 208A and the outer edge 204AE on the inner side of the bottom of the corresponding first spacer 204A have a minimum distance G2 that affects the offset amount between the first flexible substrate 102 and the second flexible substrate 106 in the horizontal direction. For example, the distance G2 may be less than 5 μm, for example, may be in a range from 2 μm to 3 μm. In some embodiments, since the first spacer 204A may not overlap the corresponding second spacer 208A, the first spacer 204A and the corresponding second spacer 208A may not be affected by the uneven surface at the position of the contact hole 118, and the second spacer 208A may overlap with the contact hole 118 in the top view direction TD. In some embodiments, the positions of the first spacer 204A and the second spacer 208A in the part A on different substrates may be replaced by each other. In some embodiments, the curved design at the corner 204AR of the first spacer 204A may reduce the process difficulty. In some embodiments, the radius of curvature of the inner side of the corner 204AR of the first spacer 204A is greater than the radius of curvature of the outer side of the corner 204AR, thus enhancing the position limiting function of the inner side.

As shown in part B of FIG. 3, one of the first spacers 204B may surround one of the second spacers 208B, and the first spacer 204B may include a first portion P1B, in which the first portion P1B includes a plurality of spacers SPB separated from each other to restrict the movement of the second spacer 208B. In this disclosure, the arrangement of the first portion P1B adjacent to the second spacer 208 is referred to as a first arrangement structure. In the part B, each spacer SPB may optionally include at least one strip portion 228 (e.g. two strip portions 228). The strip portions 228 may extend along different directions (e.g., the first direction D1 or the second direction D2) and may be connected to form a single bending structure, such that there is an included angle between the strip portions 228. For example, the included angle may be about 90 degrees, so that each spacer SPB may be L-shaped, but is not limited thereto. In some embodiments, at least one of the spacers SPB may be L-shaped. In order to prevent the second spacer 208B from moving beyond the range of the first arrangement structure, the distance G4 between two adjacent spacers SPB in a direction may be less than the width 208BW of the second spacer 208b in the same direction, in which the width 208BW is the maximum width in that direction. In this embodiment, the number of spacers SPB of the first portion P1B may be four, so that the spacers SPB surround a substantially rectangular range, but is not limited thereto. In some embodiments, the included angle of each spacer SPB may also be adjusted to a required angle, such that the spacers SPB may surround a required range. In some embodiments, the number of spacers SPB of the first portion P1B may be two, the second spacer 208B is located between the two spacers SPB, and the strip portions 228 of each spacer SPB may be lengthened along the extending direction (e.g., arrow direction), so that the distance G4 between two adjacent strip portions 228 extending in different directions may be less than the width 208BW of the second spacer 208B. In some embodiments, the positions of the first spacer 204B and the second spacer 208B in the part B disposed on different substrates may be replaced by each other. In some embodiments, the curved design at the corner 204BR of the first spacer 204B may reduce the process difficulty. In some embodiments, the radius of curvature of the inner side of the corner 204BR of the first spacer 204B is greater than the radius of curvature of the outer side of the corner 204BR, thus enhancing the position limiting function of the inner side.

As shown in part C of FIG. 3, the first spacer 204C may further include another first portion P1C, in which the first part P1C includes a plurality of spacers SPC separated from each other and arranged as another first arrangement structure, and the second spacer 208C is located within the another first arrangement structure to restrict the movement of the second spacer 208C. Different from the part B, in the part C, the spacers SPC may be blocks, and the center points of the spacers SPC can be connected to each other into a region R. As used herein, "the second spacer 208C is located in the arrangement structure" means that at least a portion of the second spacer 208C is located in the region R in the top view direction TD. In this embodiment, the first portion P1C of the first spacer 204C may include at least three spacers SPC, any two adjacent spacers SPC have a distance in a direction, and at least one of the distances may be less than the width of the second spacer 208C in the same direction. In some embodiments, in the same direction (e.g., the first direction D1), another distance G3 of the distances may be greater than the width 208CW of the second spacer 208C. In such situation, an extension line L1 is found on the edge of the opening 112a adjacent to the second spacer 208C, and in a direction the same as the extending direction (i.e., the second direction D2) of the data line DL, the shortest distance from the center point of the second spacer 208C to the extension line L1 is W1. The shortest distance from the center point of the second spacer 208C to the adjacent another opening 112a is found by the same method, in which the gap of the distance G3 faces the another opening 112a, and the distance W2 needs to be greater than the distance W1, so as to reduce the situation that the second spacer 208C moves into the opening 112a due to bending.

As shown in part D of FIG. 3, the first spacer 204D may further include another first portion P1D, in which the first portion P1D of the first spacer 204D includes a spacer SPD1 and another spacer SPD2 separated from each other. The spacer SPD1 and the another spacer SPD2 are arranged as another first arrangement structure, and the second spacer 208D is located between the two spacers SPD1 and SPD2 to restrict the movement of the second spacer 208D. FIG. 3 shows the shape of the outer edge of the bottom of the spacer. In this embodiment, on a plane parallel to the first direction D1, the projection width of the second spacer 208D may be greater than the projection distance between the two spacers SPD1, SPD2, and/or on a plane parallel to the second direction D2, the projection width of the second spacer 208D may be greater than the projection distance between the two spacers SPD1, SPD2, thereby restricting the movement of the second spacer 208D in the first direction D1 and/or the second direction D2. In the part D, the spacers SPD1 and SPD2 may also be blocks, and different from the part C, the spacers SPD1 and SPD2 may be arranged in one direction, for example, this direction is different from the first direction D1 and the second direction D2. The center points of the spacers SPD1, SPD2 may be connected to each other to form a connection line CL. As mentioned herein, "the second spacer 208D is located between the two spacers SPD1 and SPD2" means that at least a portion of the second spacer 208D crosses the connection line CL in the top view direction TD. In addition, the above-mentioned blocks may be rectangular, square, triangular, etc., and are not limited thereto.

In some embodiments, any one of the first spacers and the corresponding second spacer of the liquid crystal display device 200 may use the first spacer and the corresponding second spacer of at least one of the parts A, B, C, D. In some embodiments, any one of the first spacers and the corresponding second spacer of the liquid crystal display device 200 may also use the first spacers 104 and the second spacers 108 of the first embodiment. In some embodiments, the first spacer and the second spacer of the liquid crystal display device 200 may also use a combination of the first spacer and the corresponding second spacer of at least one of the parts A, B, C, D and the first spacer 104 and the second spacer 108 of the first embodiment.

Figure 5:
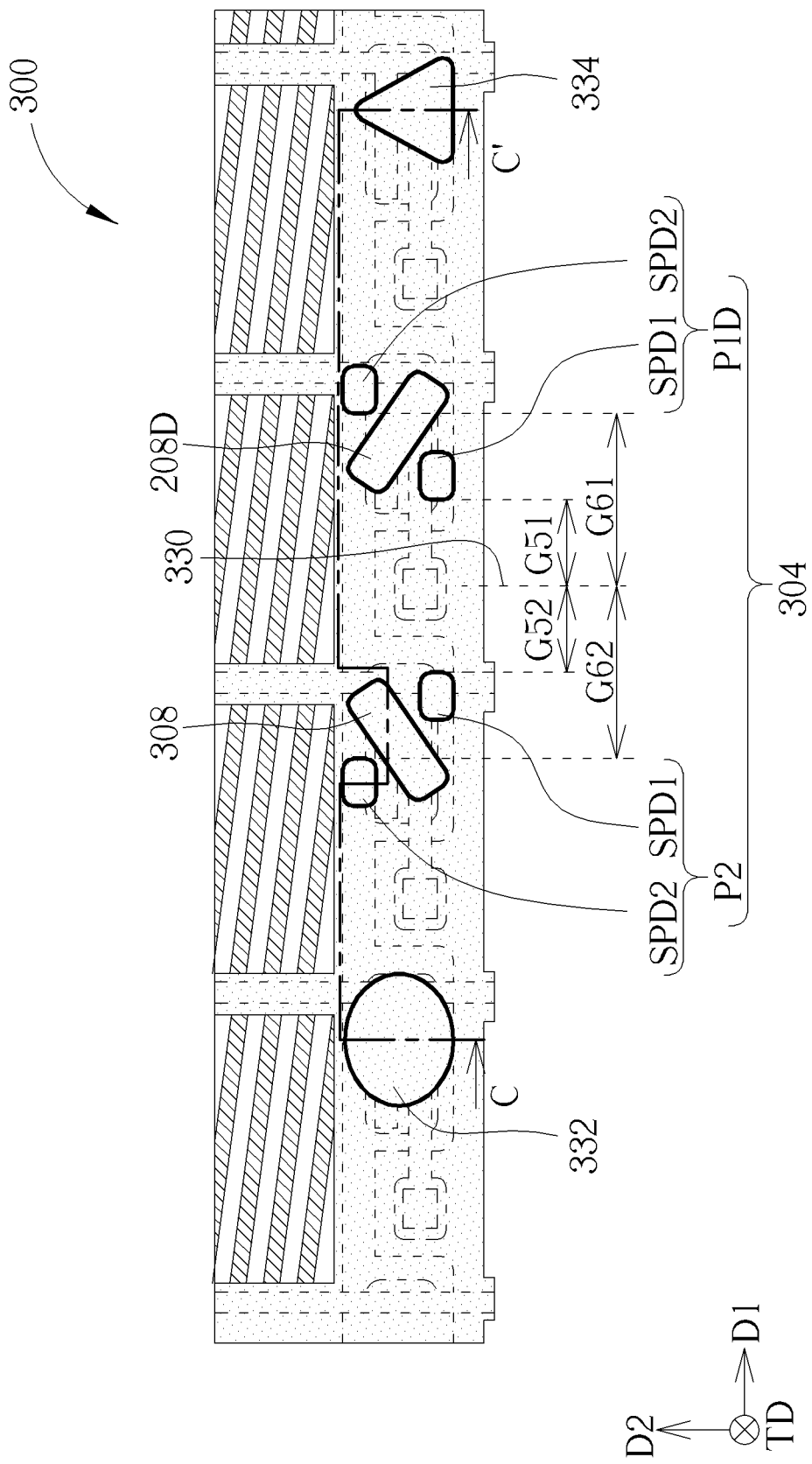
FIG. 5 is a schematic diagram illustrating a top view of an electronic device according to a third embodiment of the present disclosure.
Figure 6:
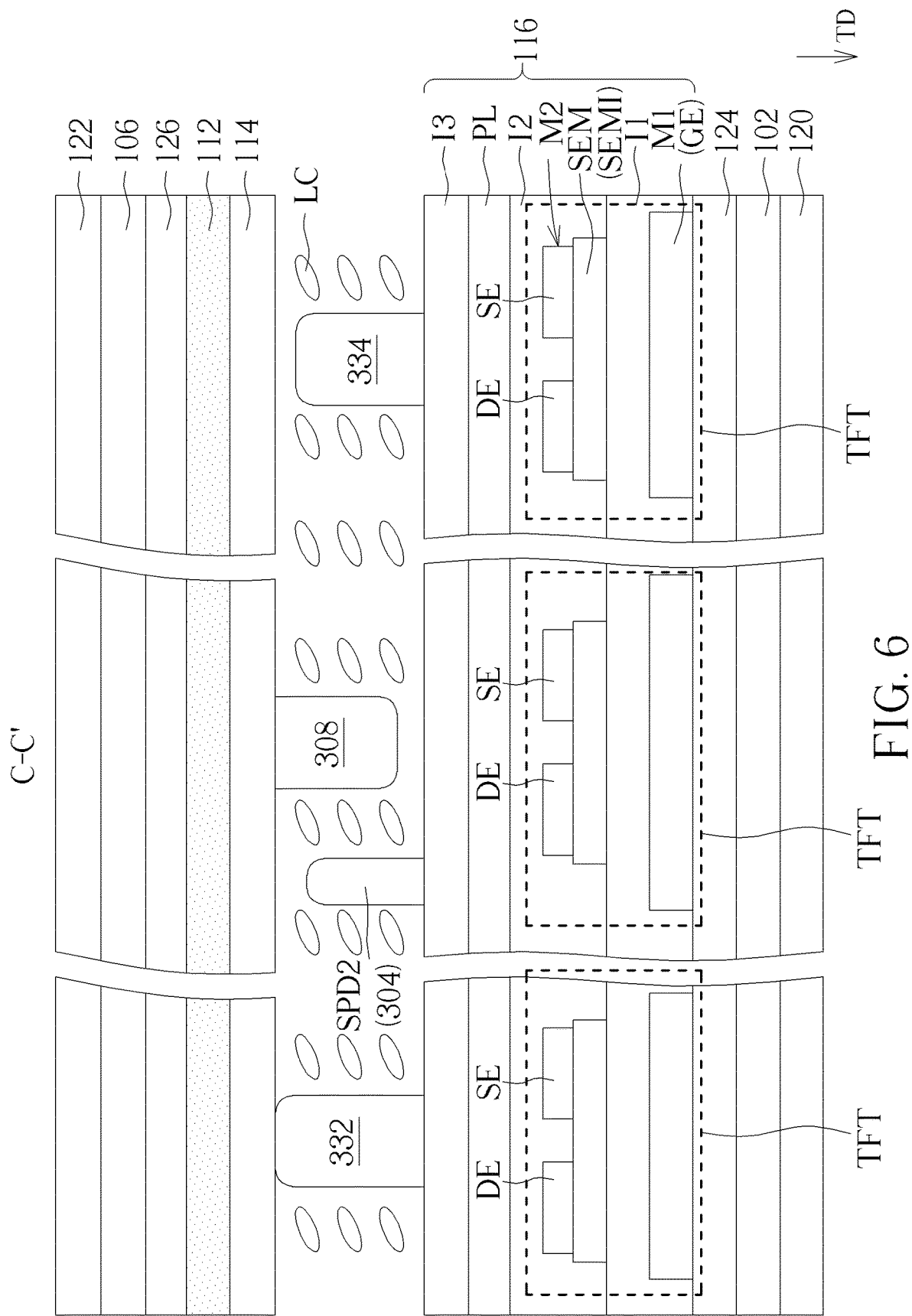
FIG. 6 is a schematic diagram illustrating a cross-sectional view of FIG. 5 taken along a cross-sectional line C-C'.

FIG. 5 is a schematic diagram illustrating a top view of an electronic device according to a third embodiment of the present disclosure, and FIG. 6 is a schematic diagram illustrating a cross-sectional view of FIG. 5 taken along a cross-sectional line C-C'. The electronic device of this embodiment takes the liquid crystal display device 300 as an example, but is not limited thereto. For illustrating the liquid crystal display device 300 clearly, the liquid crystal display device 300 shown in FIG. 5 omits the second flexible substrate, the color filter layer, the liquid crystal layer and the insulation layer, but is not limited thereto. In the liquid crystal display device 300 of this embodiment, the first spacer 304 may include a first portion P1D and a second portion P2, in which the first portion P1D is arranged as a first arrangement structure, the second portion P2 is arranged as a second arrangement structure, and the first arrangement structure is symmetrical to the second arrangement structure.

In this embodiment, the first portion P1D may be arranged, for example, the same as the first portion P1D in the part D shown in FIG. 3, and is not limited thereto. The first portion P1D and the second portion P2 may respectively include a spacer SPD1 and another spacer SPD2, the second spacer 208D is located between the two spacers SPD1, SPD2 of the first portion P1D, and another second spacer 308 is located between the two spacers SPD1, SPD2 of the second portion P2. The first portion P1D and the second portion P2 have an axis of symmetry 330 therebetween, and the first portion P1D and the second portion P2 are symmetrical to each other with respect to the axis of symmetry 330. In other words, a distance G51 is between the spacer SPD1 of the first portion P1D and the axis of symmetry 330, a distance G52 is between the spacer SPD1 of the second portion P2 and the axis of symmetry 330, and the distance G51 may be substantially equal to the distance G52. A distance G61 is between the another spacer SPD2 of the first portion P1D and the axis of symmetry 330, a distance G62 is between the another spacer SPD2 of the second portion P2 and the axis of symmetry 330, and the distance G61 may be substantially equal to the distance G62. In some embodiments, the distance G51 may be different from the distance G61. For example, the first portion P1D is arranged as a first arrangement structure, the second portion P2 is arranged as a second arrangement structure, and the first arrangement structure is different from the second arrangement structure, such that the first portion P1D and the second portion P2 may restrict the movement of the second spacers 208D, 308 in one direction (such as the first direction D1 or the second direction D2). In this embodiment, an error range of 0 to 3 μm is within a range of the term "substantially equal to".

In addition, on the plane parallel to the first direction D1, the projection width of the second spacer 308 of the second portion P2 may be greater than the projection distance between the two spacers SPD1, SPD2 of the second portion P2, and/or on a plane parallel to the second direction D2, the projection width of the second spacer 308 of the second portion P2 may be greater than the projection distance between the two spacers SPD1, SPD2 of the second portion P2, thereby limiting the movement of the second spacer 308 in the first direction D1 and/or the second direction D2.

In other words, the first portions P1D and the second portions P2 of the first spacer 304 and the corresponding second spacers 208D, 308 may constitute a position limiting combination, and by means of different arranging directions of the spacers SPD1, SPD2 of the first portion P1D and the spacers SPD1, SPD2 of the second portion P2 in the position limiting combination, the function of restricting the local relative position of the corresponding second spacers 208D, 308 can be achieved, thereby reducing relative movement between the first flexible substrate 102 and the second flexible substrate 106 in the horizontal direction to improve the display quality of the liquid crystal display device 300. In some embodiments, the liquid crystal display device 300 may include a plurality of position limiting combinations, and the distances G51, G52, G61, G62 in one of the position limiting combinations may be respectively equal to the distances G51, G52, G61, G62 in another one of the position limiting combinations.

As shown in FIG. 5 and FIG. 6, in some embodiments, the liquid crystal display device 300 may further include a plurality of supporting spacers (such as supporting spacer 332 shown in FIG. 5) disposed between the first flexible substrate 102 and the second flexible substrate 106. Specifically, the supporting spacer is used for maintaining the gap uniformity of the liquid crystal layer 110, and thus, the supporting spacers may be in contact with the alignment layer, but the present disclosure is not limited thereto. In some embodiments, the supporting spacer may also be in contact with the film layer that contacts the liquid crystal layer 110. For example, the film layer may be the insulation layer, the color filter layer or shielding pattern. In some embodiments, the liquid crystal display device 100 may further include a plurality of auxiliary spacers (as auxiliary spacer 334 shown in FIG. 5). In the cross-sectional view, a height of each auxiliary spacer 334 may be less than a height of the supporting spacer 332. In this embodiment, the supporting spacer is circle, and the auxiliary spacer is triangular, but not limited thereto. It is noted that in this disclosure, surfaces of the above-mentioned first spacer, second spacer, supporting spacer and auxiliary spacer may be curved, such that when the spacers are squeezed, the top surfaces may disperse pressure to prevent the spacers from being damaged, and the present disclosure is not limited thereto. For example, when the first spacer 304, the supporting spacer 332 and/or the auxiliary spacer 334 are formed on the first flexible substrate 102, the surfaces of the first spacer 304, the supporting spacer 332 and/or the auxiliary spacer 334 facing the second flexible substrate 106 may be curved. The curved surface mentioned herein may be similar to or equal to the curved surface 104a of the first spacer 104 and the curved surface 108a of the second spacer 108 in the first embodiment. When the second spacer 308 is formed on the second flexible substrate 106, the surface of the second spacer 308 facing the first flexible substrate 102 may be curved. Alternatively, in other embodiments, when the first spacer 304, the supporting spacer 332 and/or the auxiliary spacer 334 are formed on the second flexible substrate 106, the surfaces of the first spacer 304, the supporting spacer 332 and/or the auxiliary spacer 334 may be curved, and when the second spacer 308 is formed on the first flexible substrate 102, the surface of the second spacer 308 facing the second flexible substrate 106 may be curved.

Figure 7:
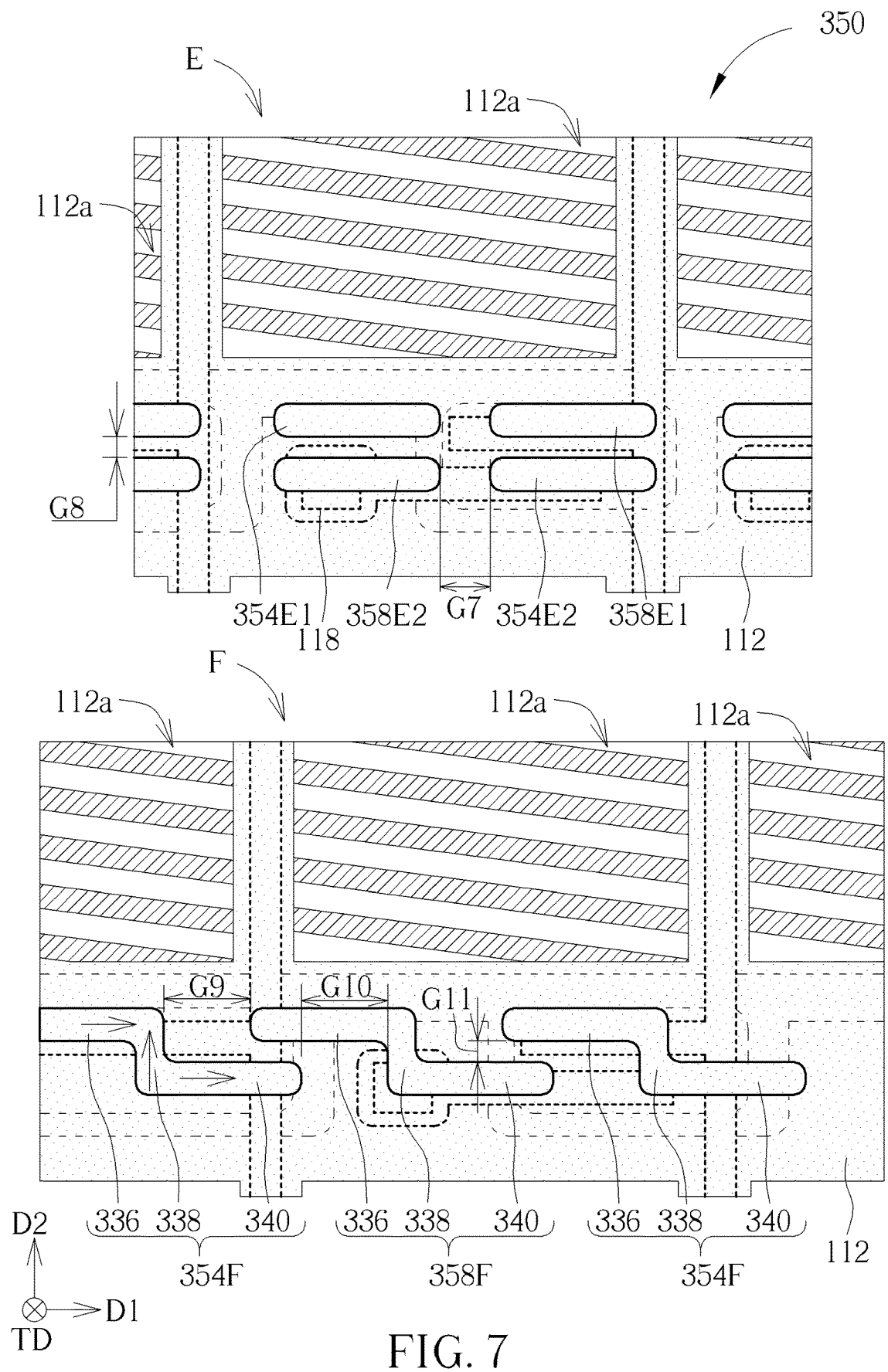
FIG. 7 is a schematic diagram illustrating a top view of an electronic device according to a fourth embodiment of the present disclosure.

FIG. 7 is a schematic diagram illustrating a top view of an electronic device according to a fourth embodiment of the present disclosure. For clearly illustrating the position limiting combination, FIG. 7 omits the supporting spacer and the auxiliary spacer, but is not limited thereto. As shown in part E of FIG. 7, the position limiting combination may include at least two first spacers 354E1, 354E2 and at least two second spacers 358E1, 358E2, in which the first spacers 354E1, 354E2 and the second spacers 358E1, 358E2 are alternately arranged as at least two rows or more. In this embodiment, the first spacer 354E1 and the second spacer 358E1 may be sequentially arranged in the first direction D1, and the second spacer 358E2 and the first spacer 354E2 may be sequentially arranged in the first direction D1. In some embodiments, the first spacers 354E1, 354E2 and the second spacers 358E2, 358E1 may be arranged in the second direction D2. In such situation, the spacers cannot cover the opening 112a to avoid affecting the aperture ratio. Through the above-mentioned alternate arrangement, the first spacers 354E1, 354E2 and the second spacers 358E1, 358E2 can achieve the function of limiting the local relative position, thereby reducing the relative movement between the first flexible substrate and the second flexible substrate in the horizontal direction, so as to improve the display quality of the liquid crystal display device 350. In some embodiments, the distance G7 between the first spacer 354E1 and the second spacer 358E1 may be less than 5 μm, for example, may range from 2 μm to 3 μm. Alternatively, the distance G8 between the first spacer 354E1 and the second spacer 358E2 may be less than 5 μm, for example, may range from 2 μm to 3 μm. In some embodiments, the first direction D1 may be perpendicular to the second direction D2, for example. In some embodiments, the first spacer 354E1 or the second spacer 358E2 may overlap the contact hole 118 in the top view direction TD, and is not limited thereto. The first spacers 354E1, 354E2 and the second spacers 358E1, 358E2 may be strips extending along the same direction, strips extending along different directions, or circles, etc., but not limited thereto.

As shown in part F of FIG. 7, the position limiting combination may include at least two first spacers 354F and at least one second spacer 358F, and the second spacer 358F may be disposed between the two first spacers 354F. Different from the part E, in the part F, the second spacer 358F and the first spacers 354F are arranged in the same row. In this embodiment, each of the first spacers 354F and the second spacer 358F may be a double bending structure and include a first strip portion 336, a second strip portion 338 and a third strip portion 340, respectively. One end of the first strip portion 336 is connected to one end of the second strip portion 338, and the other end of the second strip portion 338 is connected to one end of the third strip portion 340, in which the extending direction of the first strip portion 336 (e.g., arrow) and the extending direction of the third strip portion 340 (e.g., arrow) may be different from the extending direction of the second strip portion 338 (e.g., arrow) so as to form the double bending structure. In this embodiment, the double bending structure may be, for example, a zigzag shape, and is not limited thereto. As shown in FIG. 7, the first spacers 354F and the second spacer 358F may be arranged in the first direction D1, the extending direction of the first strip portion 336 and the third strip portion 340 may be, for example, the first direction D1, and the extending direction of the second strip portion 338 may be, for example, the second direction D2.

On the plane parallel to the first direction D1, the projection of the first strip portion 336 of the second spacer 358F may overlap the projection of the third strip portion 340 of the adjacent first spacer 354F, and the projection of the third strip portion 340 of the same second spacer 358F may overlap the projection of the first strip portion 336 of another adjacent first spacer 354F. On the plane parallel to the second direction D2, the projection of the second strip portion 338 of the second spacer 358F may overlap the projection of the second strip portion 338 of the adjacent first spacer 354F, and the projection of the second strip portion 338 of the same second spacer 358F may overlap the projection of the second strip portion 338 of another adjacent first spacer 354F, so the movement of the second spacer 358F in the first direction D1 and the second direction D2 may be limited by the first spacers 354F. Therefore, the relative movement between the first flexible substrate and the second flexible substrate in the horizontal direction can be reduced to improve the display quality of the liquid crystal display device 350.

In some embodiments, there may be a distance G9 between the first strip portion 336 of one of the first spacers 354F and the first strip portion 336 of the second spacer 358F, a distance G10 between the third strip portion 340 of the first spacer 354F and the third strip portion 340 of the second spacer 358F, and a distance G11 between the third strip portion 340 of the second spacer 358F and the first strip portion 336 of another one of the first spacers 354F. The distances G9, G10, G11 may be less than 5 μm, respectively, for example, may range from 2 μm to 3 μm. In some embodiments, one of the second spacer 358F and the first spacer 354F adjacent to each other may not include the first strip portion, or one of the second spacer 358F and the first spacer 354F adjacent to each other may not include the third strip portion. In some embodiments, at least one of the first spacer 354F or the second spacer 358F may be zigzag-shaped.

In some embodiments, the first spacers and the second spacers of the liquid crystal display device may use a combination of at least two of the first spacer 104 and the second spacer 108 of FIG. 1, the first spacer and the corresponding second spacer of at least one of parts A, B, B, D of FIG. 3, the position limiting combination of FIG. 5, and the position limiting combination of at least one of parts E, F of FIG. 7.

As mentioned above, the electronic device of the present disclosure can reduce the relative movement between the first flexible substrate and the second flexible substrate in the horizontal direction by overlapping the first spacer and the second spacer, or disposing a single second spacer in the arrangement structure of the first spacer or between the first spacers, or by the position limiting combination of the first spacer and the second spacer, thereby mitigating the offset of the pixel electrode and the corresponding color filter block or the corresponding opening in the top view direction to improve the display quality.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A liquid crystal display device, comprising:
   a first flexible substrate;
   a plurality of first spacers disposed on the first flexible substrate;

a second flexible substrate disposed opposite to the first flexible substrate;
a plurality of second spacers disposed on the second flexible substrate; and
a liquid crystal layer disposed between the first flexible substrate and the second flexible substrate,
wherein at least one of the plurality of first spacers or the plurality of second spacers has a corner, and wherein a radius of curvature of an inner side of the corner is greater than a radius of curvature of an outer side of the corner.

2. The liquid crystal display device according to claim 1, wherein a first portion of the plurality of first spacers is arranged as a first arrangement structure.

3. The liquid crystal display device according to claim 2, wherein one of the plurality of second spacers is located in the first arrangement structure.

4. The liquid crystal display device according to claim 2, wherein any two of the plurality of first spacers of the first portion adjacent to each other have a distance, and in a same direction, one of the distances is less than a width of one of the plurality of second spacers.

5. The liquid crystal display device according to claim 1, wherein one of the plurality of first spacers surrounds one of the plurality of second spacers.

6. The liquid crystal display device according to claim 1, wherein at least one of the plurality of first spacers is L-shaped.

7. The liquid crystal display device according to claim 1, wherein at least one of the plurality of first spacers or the plurality of second spacers is Z-shaped.

8. The liquid crystal display device according to claim 1, wherein an outer edge of a bottom of one of the plurality of second spacers and an outer edge on an inner side of a bottom of a corresponding one of the plurality of first spacers have a distance.

9. The liquid crystal display device according to claim 1, further comprising a plurality of supporting spacers disposed between the first flexible substrate and the second flexible substrate.

10. The liquid crystal display device according to claim 1, further comprising a first polarizer and a second polarizer, the first polarizer being attached to a side of the first flexible substrate away from the plurality of first spacers, and the second polarizer being attached to a side of the second flexible substrate away from the plurality of second spacers.

11. The liquid crystal display device according to claim 1, wherein one of the plurality of first spacers and one of the plurality of second spacers are alternately arranged in a first direction, and a projection of the one of the plurality of second spacers on a plane parallel to the first direction overlaps a projection of the one of the plurality of first spacers on the plane.

* * * * *